(12) United States Patent
Kojima (10) Patent No.: US 10,851,866 B2
(45) Date of Patent: Dec. 1, 2020

(54) VIBRATION DAMPING DEVICE

(71) Applicant: BRIDGESTONE CORPORATION, Tokyo (JP)

(72) Inventor: Hiroshi Kojima, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 0 days.

(21) Appl. No.: 16/335,548

(22) PCT Filed: Sep. 26, 2017

(86) PCT No.: PCT/JP2017/034714
§ 371 (c)(1),
(2) Date: Mar. 21, 2019

(87) PCT Pub. No.: WO2018/062165
PCT Pub. Date: Apr. 5, 2018

(65) Prior Publication Data
US 2019/0346009 A1    Nov. 14, 2019

(30) Foreign Application Priority Data

Sep. 27, 2016 (JP) .................... 2016-187796
Sep. 27, 2016 (JP) .................... 2016-187797

(51) Int. Cl.
*F16F 13/10* (2006.01)
*B60K 5/12* (2006.01)

(52) U.S. Cl.
CPC ............ *F16F 13/10* (2013.01); *B60K 5/1208* (2013.01); *F16F 13/105* (2013.01);
(Continued)

(58) Field of Classification Search
CPC combination set(s) only.
See application file for complete search history.

(56) References Cited

U.S. PATENT DOCUMENTS 5,964,456 A * 10/1999 Someya ................. F16F 13/10
 267/140.13
6,073,918 A * 6/2000 Kojima ................. F16F 13/262
 267/140.14
(Continued)

FOREIGN PATENT DOCUMENTS

CN    201884544 U    6/2011
JP    2000-2298 A    1/2000
(Continued)

OTHER PUBLICATIONS

Communication dated Sep. 24, 2019, from the European Patent Office in counterpart European Application No. 17856115.5.
(Continued)

*Primary Examiner* — Monica E Millner
(74) *Attorney, Agent, or Firm* — Sughrue Mion, PLLC (57) ABSTRACT

A vibration damping device (1, 10, 100) includes a tubular metal bracket (20, 120), a first attachment member (12, 112), a second attachment member (11, 23, 111), an elastic body (13, 113), a partition member (17, 117), and a diaphragm (19, 119). A fixed portion (11g, 23c, 111c) fixed to a fixing portion (20b, 120b) of the metal bracket is formed in the second attachment member. A gap (S2, S21) is provided between a portion of an outer circumferential surface of the second attachment member except for the fixed portion, and a portion of an inner circumferential surface of the metal bracket except for the fixing portion, and a second seal portion (22, 123) is provided between the fixed portion and the fixing portion.

9 Claims, 4 Drawing Sheets

(52) U.S. Cl.
CPC ... *F16F 2224/0208* (2013.01); *F16F 2230/26* (2013.01); *F16F 2230/30* (2013.01); *F16F 2230/48* (2013.01)

(56) References Cited

U.S. PATENT DOCUMENTS

| | | | | |
|---|---|---|---|---|
| 6,120,011 | A * | 9/2000 | Maeno | B60K 5/1291 267/140 |
| 8,011,644 | B2 * | 9/2011 | Saito | F16F 13/105 267/140.13 |
| 8,960,654 | B2 * | 2/2015 | Kojima | F16F 13/10 267/140.11 |
| 9,200,694 | B2 * | 12/2015 | Kojima | F16F 13/108 |
| 9,279,472 | B2 * | 3/2016 | Han | F16F 13/10 |
| 10,100,897 | B2 * | 10/2018 | Yasuda | F16F 13/26 |
| 2004/0183241 | A1 * | 9/2004 | Goto | F16F 13/103 267/140.13 |
| 2006/0043658 | A1 * | 3/2006 | Tanaka | F16F 13/10 267/140.13 |
| 2006/0091281 | A1 * | 5/2006 | Miyahara | F16F 13/085 248/636 |
| 2007/0176339 | A1 * | 8/2007 | Minamisawa | B60K 5/1208 267/140.13 |
| 2008/0284075 | A1 | 11/2008 | Saito et al. | |
| 2009/0008845 | A1 * | 1/2009 | Tanaka | F15B 15/10 267/64.15 |
| 2012/0299228 | A1 | 11/2012 | Matsuda | |
| 2015/0060633 | A1 | 3/2015 | Han | |

FOREIGN PATENT DOCUMENTS

| | | | | |
|---|---|---|---|---|
| JP | 2005-106150 | A | | 4/2005 |
| JP | 2006-064069 | | * | 3/2006 ............. F16F 13/10 |
| JP | 2006-064069 | A | | 3/2006 |
| JP | 2008-138855 | A | | 6/2008 |
| JP | 2010-96221 | A | | 4/2010 |
| JP | 2010-270784 | A | | 12/2010 |
| JP | 2011-144830 | A | | 7/2011 |
| JP | 2012-57780 | A | | 3/2012 |

OTHER PUBLICATIONS

International Search Report for PCT/JP2017/034714 dated Nov. 21, 2017 [PCT/ISA/210].

Search Report dated Mar. 18, 2020, from the China National Intellectual Property Administration in Application No. 201780058324.2.

* cited by examiner

VIBRATION DAMPING DEVICE

TECHNICAL FIELD

The present invention relates to a vibration damping device.

This application is a National Stage of International Application No. PCT/JP2017/034714 filed Sep. 26, 2017, claiming priority based on Japanese Patent Application No. 2016-187796, filed on Sep. 27, 2016 and Japanese Patent Application No. 2016-187797, filed on Sep. 27, 2016, the contents of which are incorporated herein by reference.

BACKGROUND ART

In the related art, a vibration damping device described in Patent Document 1 below is known. The vibration damping device includes a bracket which is connected to any one of a vibration generating portion and a vibration receiving portion, a first attachment member which is connected to the other thereof, and a tubular second attachment member which is provided in the bracket. The first attachment member and the second attachment member are connected to each other by an elastic body. A partition member which partitions a liquid chamber into a main liquid chamber and an auxiliary liquid chamber is provided in the liquid chamber in the second attachment member. A restriction passages which communicates with the main liquid chamber and the auxiliary liquid chamber is formed in the partition member.

In the vibration damping device, when vibrations are input, both attachment members are displaced relative to each other while elastically deforming the elastic body, a liquid pressure of the main liquid chamber is changed such that a liquid flows through the restriction passage, and thus, the vibrations are absorbed and dampened.

CITATION LIST

Patent Document (Patent Document 1) Japanese Unexamined Patent Application, First Publication No. 2006-64069

SUMMARY OF INVENTION

Technical Problem

Meanwhile, for example, this type of vibration damping device may be used under a high temperature environment such as the vicinity of an engine of an automobile. In this case, since heat is transmitted to the second member in the bracket, the temperature of the liquid in the liquid chamber in the second attachment member increases, and thus, there is a possibility that cavitation occurs or an attachment portion between the second attachment member and the elastic body deteriorates.

The present invention is made in consideration of the above-described circumstances, and an object thereof is to provide a vibration damping device capable of preventing heat from being transmitted to the attachment member provided in the bracket.

Solution to Problem

In order to achieve the above-described object, according to the present invention, there is provided a tubular metal bracket which is connected to any one of a vibration generating portion and a vibration receiving portion, a first attachment member which is connected to the other of the vibration generating portion and the vibration receiving portion, a tubular second attachment member which is inserted into the metal bracket, an elastic body which connects the first attachment member and the second attachment member, a partition member which partitions a liquid chamber in the second attachment member into a main liquid chamber having the elastic body as a portion of a partition wall and an auxiliary liquid chamber, and a diaphragm which constitutes a portion of a partition wall of the auxiliary liquid chamber, in which one of both end opening portions of the second attachment member in an axial direction is closed by the elastic body and the other thereof is closed by the diaphragm, a fixing portion which fixes the second attachment member is formed on the metal bracket, a fixed portion which is fixed to the fixing portion of the metal bracket is formed on the second attachment member, a gap is provided between a portion of an outer circumferential surface of the second attachment member except for the fixed portion, and a portion of an inner circumferential surface of the metal bracket except for the fixing portion, and a second seal portion is provided between the fixed portion and the fixing portion.

Advantageous Effects of Invention

According to the present invention, it is possible to provide a vibration damping device capable of preventing heat from being transmitted to an attachment member provided in a bracket.

DESCRIPTION OF EMBODIMENTS

First Embodiment

Hereinafter, a configuration of a vibration damping device according to a first embodiment will be described with reference to FIG. 1.

Figure 1:
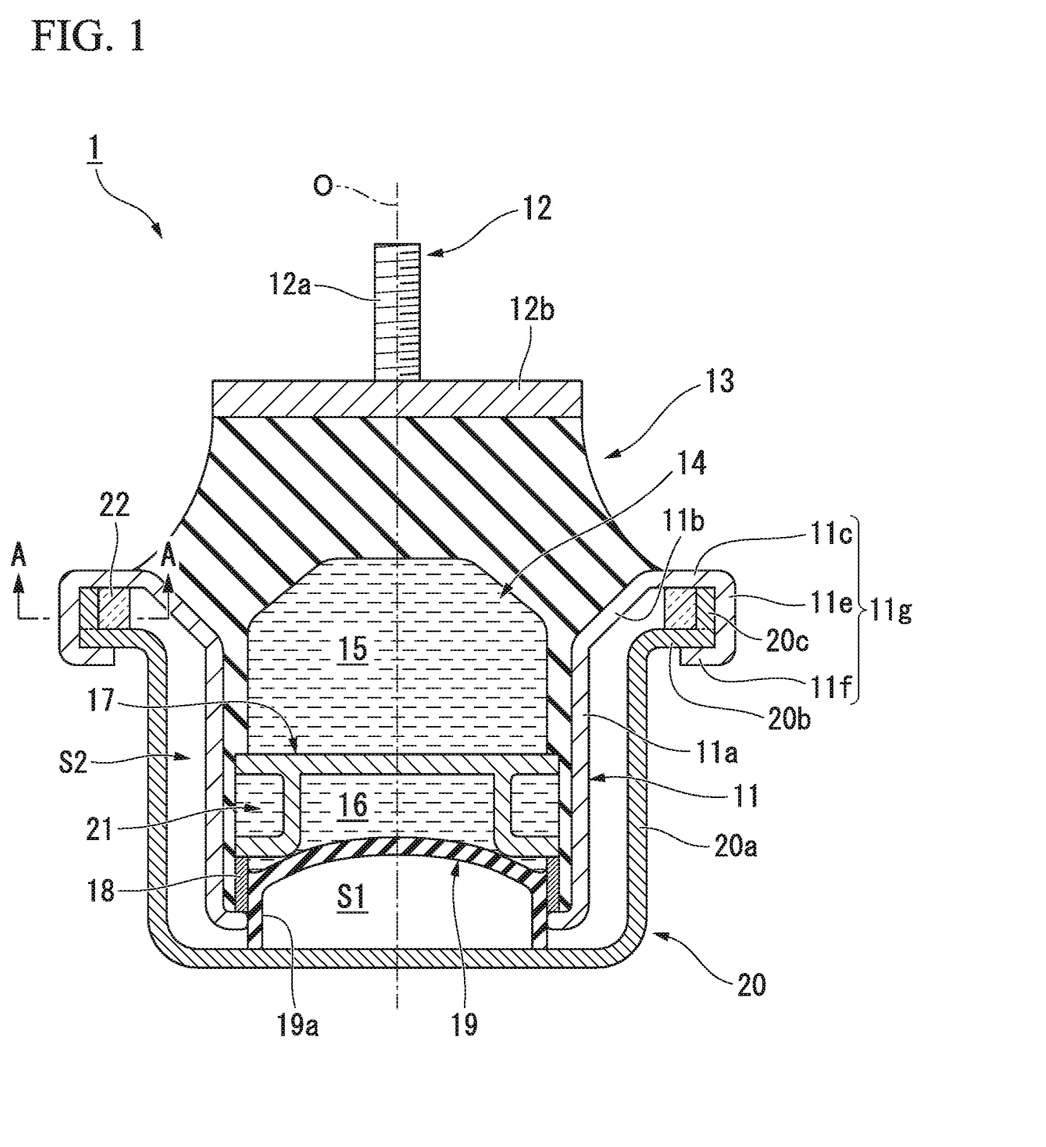
FIG. 1 is a longitudinal sectional view of a vibration damping device according to a first embodiment.

As shown in FIG. 1, a vibration damping device 1 includes a tubular metal bracket 20 which is connected to any one of a vibration generating portion and a vibration receiving portion, a first attachment member 12 which is connected to the other thereof, a tubular second attachment member 11 which is inserted into the metal bracket 20, an elastic body 13 which connects the first attachment member 12 and the second attachment member 11 to each other, a partition member 17 which partitions a liquid chamber 14 in the second attachment member 11 in which a liquid is enclosed into a main liquid chamber 15 having the elastic body 13 as a portion of a partition wall and an auxiliary liquid chamber 16 in an axial direction along a center axis O of the second attachment member 11, and a diaphragm 19 which constitutes a portion of the partition wall of the auxiliary liquid chamber 16. The second attachment member 11 is connected to any one of the vibration generating portion and the vibration receiving portion via the metal bracket 20.

For example, a case where the vibration damping device 1 is used as an engine mount of an automobile, the second attachment member 11 is connected to a vehicle body serving as the vibration receiving portion via the metal bracket 20, and the first attachment member 12 is connected to an engine serving as the vibration generating portion. Accordingly, vibrations of the engine are prevented from being transmitted to the vehicle body. In the way, in a case where the vibration damping device 1 is connected to the engine, heat of the engine is transmitted to the metal bracket 20, and thus, the temperature of the metal bracket 20 increases.

Here, in the first embodiment, the main liquid chamber 15 side along the axial direction with respect to the partition member 17 is referred to as an upper side, and the auxiliary liquid chamber 16 side along the axial direction is referred to as a lower side. In addition, in a plan view when the vibration damping device 1 is viewed in the axial direction, a direction orthogonal to the center axis O is referred to as a radial direction, and a direction around the center axis O is referred to as a circumferential direction.

The first attachment member 12 is formed in a rod shape, and includes an attachment shaft 12a which is provided coaxially with the center axis O and a disk-shaped connection plate 12b which extends radially outward from a lower end of the attachment shaft 12a. A male screw portion which connects the vibration damping device 1 to the vehicle body or the like is formed on an outer circumferential surface of the attachment shaft 12a. A lower surface of the connection plate 12b is vulcanization-bonded to an upper end surface of the elastic body 13.

The second attachment member 11 includes a main body tubular portion 11a which is formed in a tubular shape coaxially with the center axis O and an inclination tubular portion 11b which extends upward as going radially outward from an upper end opening edge of the main body tubular portion 11a. A lower end opening portion of the main body tubular portion 11a is caulked radially inward. An inner circumferential surface of the main body tubular portion 11a is covered with a coating rubber. The coating rubber is formed integrally with the elastic body 13.

The elastic body 13 is formed of a material having elasticity such as rubber. The elastic body 13 gradually extends radially outward as going downward from a lower surface of the connection plate 12b. An outer circumferential side of the elastic body 13 is vulcanization bonded to an inner circumferential surface of the inclination tubular portion 11b of the second attachment member 11. An upper end opening portion of the second attachment member 11 is hermetically sealed by the elastic body 13.

A tubular diaphragm ring 18 is liquid-tightly fitted into a lower end portion of the second attachment member 11 via a coating rubber. An outer circumferential portion of the disk-shaped diaphragm 19 which is formed of a robber material or the like in an elastically deformable manner is vulcanization-bonded to an inner circumferential surface of the diaphragm ring 18. The lower end portion of the second attachment member 11 is caulked radially inward, and thus, the diaphragm ring 18 is fixed. The lower end opening portion of the second attachment member 11 is hermetically sealed by the diaphragm 19.

The liquid chamber 14 in the second attachment member 11 in which the liquid is enclosed is defined by the diaphragm 19 and the elastic body 13. In addition, for example, water, ethylene glycol, or the like can be used as the liquid.

A lower tubular portion 19a extending downward is formed on an outer circumferential edge portion of the diaphragm 19. The lower tubular portion 19a protrudes downward from the second attachment member 11.

The partition member 17 is formed in a flat disk shape and is fitted into the second attachment member 11. Accordingly, the liquid chamber 14 in the second attachment member 11 is partitioned into the main liquid chamber 15 which is defined by the elastic body 13 and the partition member 17 and the auxiliary liquid chamber 16 which is defined by the diaphragm 19 and the partition member 17. In addition, the diaphragm 19 is deformed to be expanded or contracted according to an inflow of the liquid into the auxiliary liquid chamber 16 and an outflow of the liquid from the auxiliary liquid chamber 16.

A restriction passage 21 which communicates with the main liquid chamber 15 and the auxiliary liquid chamber 16 is formed in the partition member 17. The restriction passage 21 communicates with the main liquid chamber 15 and the auxiliary liquid chamber 16 through a main liquid chamber-side opening (not shown) and an auxiliary liquid chamber-side opening (not shown) which are formed in the partition member 17.

If axial vibrations are input to the vibration damping device 1, the diaphragm 19 is deformed to be expanded or contracted, and the liquid flows between the main liquid chamber 15 and the auxiliary liquid chamber 16 through the restriction passage 21. Accordingly; the vibrations are dampened and absorbed.

For example, aluminum or the like can be used as a material of the metal bracket 20.

The metal bracket 20 includes an accommodation tubular portion 20a which is formed in a tubular shape with a bottom coaxially with the center axis O and a fixing portion 20b which is formed on an tipper end portion of the accommodation tubular portion 20a.

The main body tubular portion 11a of the second attachment member 11 is accommodated in the accommodation tubular portion 20a. That is, the lower tubular portion 19a of the diaphragm 19 is in airtight-contact with a bottom wall of the accommodation tubular portion 20a of the metal bracket 20. An air chamber S1 is defined by an upper surface in the bottom wall of the accommodation tubular portion 20a, an inner circumferential surface of the lower tubular portion 19a, and a lower surface of the diaphragm 19. For example, air having an atmospheric pressure or the like is enclosed in the air chamber S1.

Figure 2:
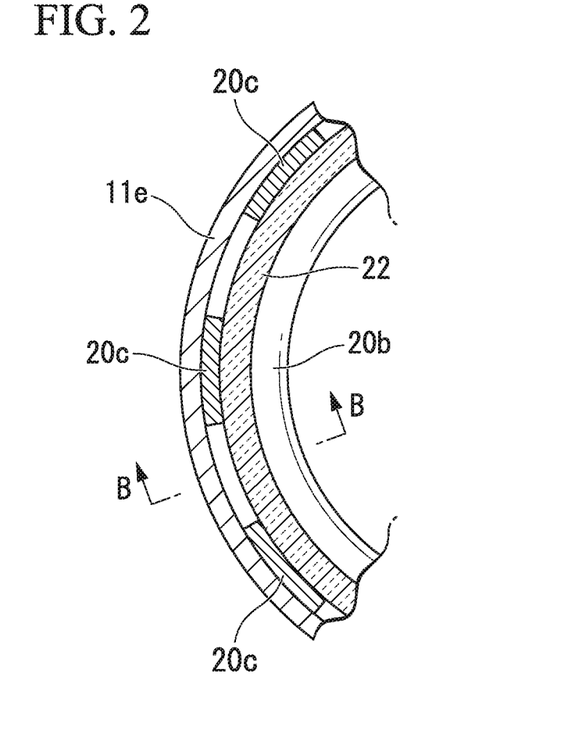
FIG. 2 is a sectional view taken along line A-A of the vibration damping device of FIG. 1.
Figure 3:
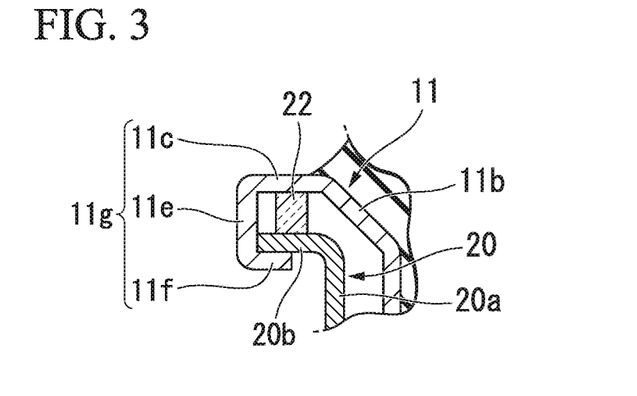
FIG. 3 is a sectional view taken along line B-B of the vibration damping device of FIG. 2.

The fixing portion 20b is formed in an annular shape which extends radially outward from an upper end opening edge of the accommodation tubular portion 20a. A protrusion (hereinafter, referred to as a rigid portion 20c) extending upward is formed on an outer circumferential edge of the fixing portion 20b. As shown in FIGS. 2 and 3, a plurality of rigid portions 20c are formed on an outer circumferential edge of the fixing portion 20b at intervals in the circumferential direction.

Here, in the second attachment member 11 of the first embodiment, an annular upper flange 11c which extends radially outward from an tipper end portion of the inclination tubular portion 11b, an upper tubular portion 11e which extends downward from an outer circumferential edge portion of the upper flange 11c, and a lower flange 11f which extends radially inward from a lower end opening edge of the upper tubular portion 11e. A fixed portion 11g includes the upper flange 11c, the upper tubular portion 11e, and the lower flange 11f. The fixing portion 20b and the rigid portions 20c of the metal bracket 20 are axially interposed between the upper flange 11c and the lower flange 11f and thus, the fixed portion 11g is fixed to the fixing portion 20b. For example, the lower flange 11f can be formed by setting the fixing portion 20b and the rigid portions 20c into the upper tubular portion 11e, and thereafter, radially inward deforming and caulking a portion of the upper tubular portion 11e downward protruding from the fixing portion 20b.

In addition, in the first embodiment, the rigid portions 20c are formed integrally with the metal bracket 20. However, the rigid portions 20c and the metal bracket 20 may be separated from each other.

An outer diameter of the main body tubular portion 11a of the second attachment member 11 is smaller than an inner diameter of the accommodation tubular portion 20a of the metal bracket 20. Accordingly, a gap S2 is formed between an outer circumferential surface of the main body tubular portion 11a and an inner circumferential surface of the accommodation tubular portion 20a. The gap S2 is provided between a portion of the outer circumferential surface of the second attachment member 11 except for the fixed portion 11g, and a portion of the inner circumferential surface of the metal bucket 20 except for the fixing portion 20b, and continuously extends over the entire circumference.

Moreover, a heat insulating member 22 which is an annular second seal portion is provided between the upper flange 11c of the fixed portion 11g and the fixing portion 20b in a compressed state. For example, a thermoplastic resin, a thermosetting resin, nylon, ceramic, or the like can be used as a material of the heat insulating member 22. The heat insulating member 22 is provided between the fixed portion 11g and the fixing portion 20b in a compressed state, the fixed portion 11g is fixed to the fixing portion 20b, and thus, the gap S2 becomes a sealed space.

In addition, each of the heat insulating member 22 and the rigid portion 20c abuts against both the upper flange 11c of the fixed portion 11g and the fixing portion 20b.

Moreover, the gap S2 in the first embodiment is a vacuum sealed space. In addition, the lower tubular portion 19a of the diaphragm 19 and the bottom wall in the accommodation tubular portion 20a of the metal bracket 20 is in airtight-contact with each other, and thus, even when the gap S2 is the vacuum sealed space, air in the air chamber S1 can be prevented from leaking into the gap S2.

In a manufacturing method of the above-described vibration damping device 1, for example, after each member is assembled in a vacuum chamber, air may be injected into the air chamber S1 from an air hole which is formed in the bottom wall of the accommodation tubular portion 20a of the metal bracket 20 in advance.

Alternatively, after the vibration damping device 1 is assembled at the atmospheric pressure, the air in the gap S2 is extracted from an air hole which is formed on a circumferential wall of the accommodation tubular portion 20a in advance, and thus, the inside of the gap S2 may be evacuated. In this case, the vibration damping device 1 may be accommodated in a vacuum chamber in a state where the air hole is open and the air in the gap S2 may be extracted, or the air hole may be connected to a decompression device or the like such that the air in the gap S2 is extracted.

According to the vibration damping device 1 configured as described above, the gap S2 continuously extending over the entire circumference is provided between the inner circumferential surface of the metal bracket 20 and the outer circumferential surface of the second attachment member 11, and the heat insulating member 22 is provided between the fixing portion 20b of the metal bracket 20 and the fixed portion 11g of the second attachment member 11. In this way, the gap S2 and the heat insulating member 22 are provided between the metal bracket 20 and the second attachment member 11, and thus, it is possible to prevent heat from being transmitted from the metal bracket 20 to the second attachment member 11.

In addition, the rigid portion 20c having a higher hardness than that of the heal insulating member 22 is provided between the fixing portion 20b and the fixed portion 11g together with the heat insulating member 22, and thus, during assembly, the heat insulating member 22 is prevented from being interposed between the fixing portion 20b and the fixed portion 11g and being largely deformed to be contracted. Accordingly, temporal contraction deformation of the beat insulating member 22 during use of the vibration damping device 1 decreases, rattling of the metal bracket 20 and the second attachment member 11 is suppressed, the gap S2 between the metal bracket 20 and the second attachment member 11 is secured, and thus, it is possible to maintain the above-described insulating effects.

In addition, for example, compared to a case where the rigid portion 20c is continuously provided on the entire circumference, the plurality of rigid portions 20c are provided at intervals in the circumferential direction, it is possible to prevent heat from being transmitted from the metal bracket 20 to the second attachment member 11 via the rigid portions 20c.

Moreover, the gap S2 is a vacuum sealed space, and thus, it is possible to more reliably prevent heat from being transmitted from the inner circumferential surface of the metal bracket 20 to the outer circumferential surface of the second attachment member 11.

Second Embodiment

Next, a second embodiment according to the present invention will be described with reference to FIG. 4. However, a basic configuration of the second embodiment is similar to that of the first embodiment. Accordingly, the same reference numerals are assigned to similar configurations, descriptions thereof are omitted, and only different matters are described.

Figure 4:
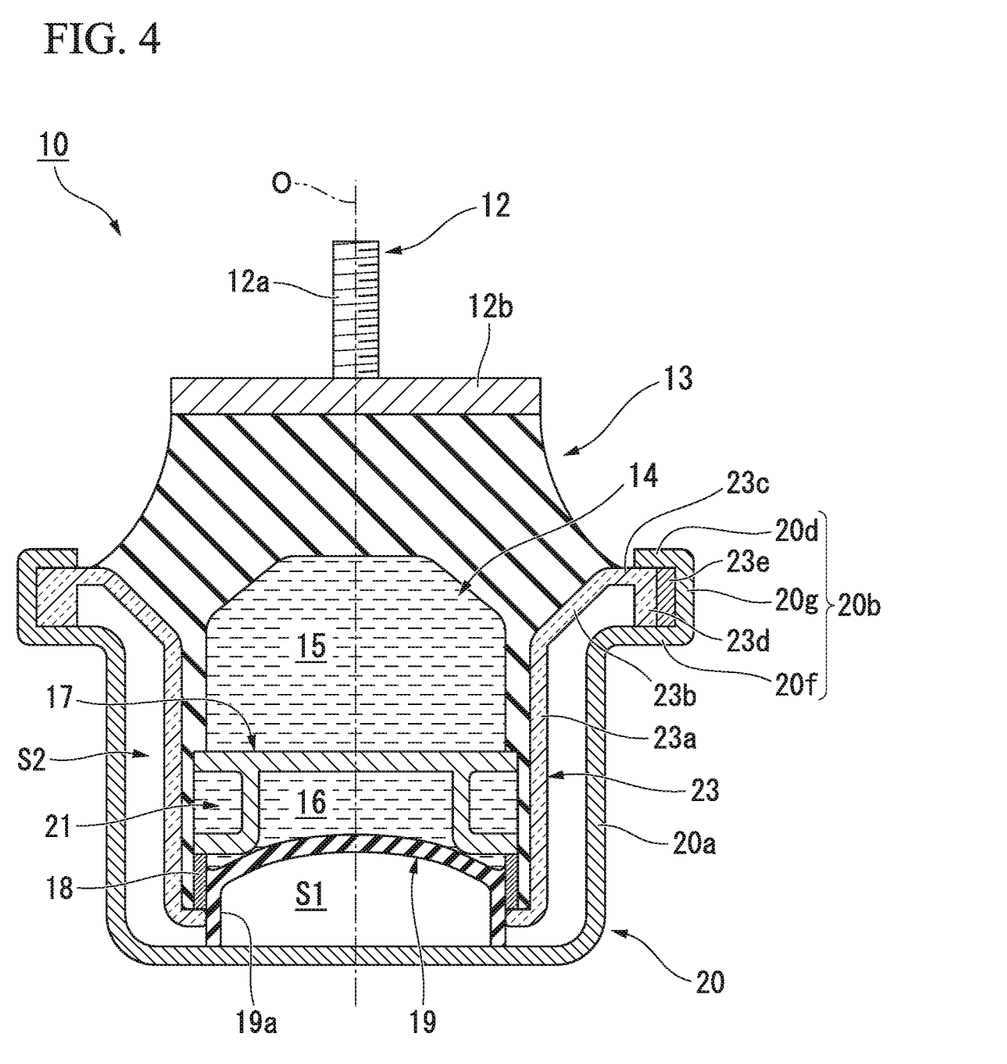
FIG. 4 is a longitudinal sectional view of a vibration damping device according to a second embodiment.

As shown in FIG. 4, a vibration damping device 10 of the second embodiment has a second attachment member 23 instead of the second attachment member 11 of the first embodiment.

The second attachment member 23 is formed of a material having a smaller thermal conductivity than that of metal and large hear insulating properties. The second attachment member 23 includes a main body tubular portion 23a, an inclination tubular portion 23b which extends radially outward as going upward from an upper end opening edge of the main body tubular portion 23a, an annular fixed portion 23c which extends radially outward from an upper end opening edge of the inclination tubular portion 23b, and a fixed tubular portion 23d which extends downward from an outer circumferential edged of the fixed portion 23c. A plurality of rigid portions 23e are provided on the fixed tubular portion 23d at intervals in the circumferential direction. The rigid portions 23e are formed of metal, and can be provided on the fixed tubular portion 23d by insert molding or the like, for example.

Moreover, the metal bracket 20 of the second embodiment includes an annular lower-side flange portion 20f which extends radially onward from the upper end opening edge of the accommodation tubular portion 20a, an upper-side tubular portion 20g which extends upward from an outer circumferential edge of the lower-side flange portion 20f, and an annular upper-side flange portion 20d which extends radially inward from an upper end opening edge of the upper-side tubular portion 20g. The fixing portion 20b of the second embodiment includes the lower-side flange portion 20f, the upper-side tubular portion 20g, and the upper-side flange portion 20d.

The fixed portion 23c and the fixed tubular portion 23d are interposed between the lower-side flange portion 20f and the upper-side flange portion 20d of the metal bracket 20 in the axial direction. Accordingly, the fixed portion 23c and the fixed tubular portion 23d are fixed to the fixing portion 20b.

According to the vibration damping device 10 of the second embodiment, the second attachment member 23 is formed of a material having larger thermal conductivity than that of metal, it is possible to more reliably prevent heat from the metal bracket 20 from being transmitted to the elastic body 13 positioned in the second attachment member 23 and the liquid in the liquid chamber 14.

Accordingly, it is possible more reliably prevent temperatures of an adhesion portion between me elastic body 13 and the second attachment member 23 from increasing, and the adhesion portion from deteriorating, the temperature of the liquid in the liquid chamber 14 from increasing, and occurrence of cavitation.

Third Embodiment

Hereinafter, a configuration of a vibration damping device according to a third embodiment will be described with reference to FIG. 5.

Figure 5:
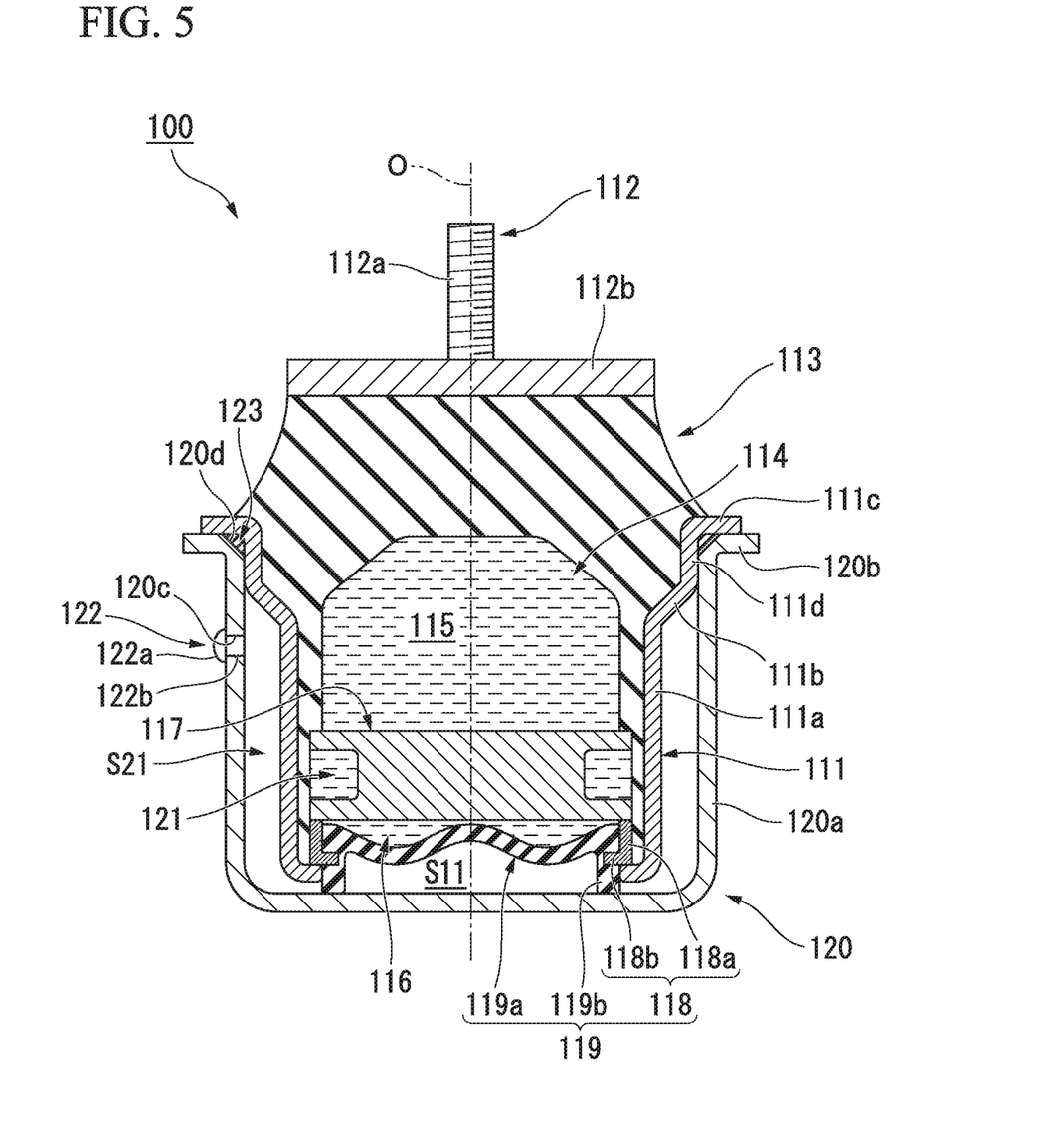
FIG. 5 is a longitudinal sectional view of a vibration damping device according to a third embodiment.

As shown in FIG. 5, a vibration damping device 100 includes a tubular metal bracket 120 which is connected to any one of the vibration generating portion and the vibration receiving portion, a first attachment member 112 which is connected to the other thereof, a tubular second attachment member 111 which is inserted into the metal bracket 120, an elastic body 113 which connects the first attachment member 112 and the second attachment member 111 to each other, a partition member 117 which partitions a liquid chamber 114 in the second attachment member 111 in which a liquid is enclosed into a main liquid chamber 115 having the elastic body 113 as a portion of a partition wall and an auxiliary liquid chamber 116 in an axial direction along a center axis O of the second attachment member 111, and a diaphragm 119 which constitutes a portion of the partition wall of the auxiliary liquid chamber 116. The second attachment member 111 is connected to any one of the vibration generating portion and the vibration receiving portion via the metal bracket 120.

For example, a case where the vibration damping device 100 is used as an engine mount of an automobile, the second attachment member 111 is connected to a vehicle body serving as the vibration receiving portion via the metal bracket 120, and the first attachment member 112 is connected to an engine serving as the vibration generating portion. Accordingly, vibrations of the engine are prevented from being transmitted to the vehicle body. In the way, in a case where the vibration damping device 1 is connected to the engine, heat of the engine is transmuted to the metal bracket 120, and thus, the temperature of the metal bracket 120 increases.

Here, in the third embodiment, the main liquid chamber 115 side along the axial direction with respect to the partition member 117 is referred to as an upper side, and the auxiliary liquid chamber 116 side along the axial direction is referred to as a lower side. In addition, in a plan view when the vibration damping device 100 is viewed in the axial direction, a direction orthogonal to the center axis O is referred to as a radial direction, and a direction around the center axis O is referred to as a circumferential direction.

The first attachment member 112 is formed in a rod shape, and includes an attachment shaft 112a which is provided coaxially with the center axis O and a disk-shaped connection plate 112b which extends radially outward from a lower end of the attachment shaft 112a. A male screw portion which connects the vibration damping device 100 to the vehicle body or the like is formed on an outer circumferential surface of the attachment shaft 112a. A lower surface of the connection plate 112b is vulcanization-bonded to an upper end surface of the elastic body 113.

The second attachment member 111 includes a main body tubular portion 111a which is funned in a tubular shape coaxially with the center axis O, an inclination tubular portion 111b which extends upward as going radially outward from an upper end opening edge of the main body tubular portion 111a, an upper tubular portion 111d which extends upward from an upper end portion of the inclination tubular portion 111b, and an annular upper-side flange portion 111c which protrudes radially outward from an upper end opening edge of the upper tubular portion Hid and is a fixed portion.

A lower end opening portion of the main body tubular portion 111a is caulked radially inward. An inner circumferential surface of the main body tubular portion 111a is covered with a coating rubber. The coating rubber is formed integrally with the elastic body 113. The upper tubular portion 111d is fitted into the metal bracket 120. In the third embodiment, the upper tubular portion 11d is press-fitted into an upper end opening portion of the metal bracket 120, and thus, the second attachment member 111 is fixed to the metal bracket 120. In addition, for example, the second attachment member 111 may be fixed to the metal bracket 120 using caulking processing or the like.

In both end opening portions of the second attachment member 111 in the axial direction, one is closed by the elastic body 113 and the other is closed body is closed by the diaphragm 119. In FIG. 5, an upper end opening portion of the second attachment member 111 is closed by the elastic body 113, and a lower end opening portion thereof is closed by the diaphragm 119.

The elastic body 113 is formed of a material having elasticity such as rubber. The elastic body 113 gradually extends radially outward as going downward from a lower surface of the connection plate 112b. An outer circumferential side of the elastic body 113 is vulcanization bonded to a portion of an upper surface of the upper-side flange portion 111c of the second attachment member 111 and inner circumferential surfaces of the upper tubular portion 111d and the inclination tubular portion 111b of the second attachment member 111.

The liquid chamber 114 in the second attachment member 111 in which the liquid is enclosed is defined by the elastic body 113, the diaphragm 119, and the coating rubber. In addition, for example, water, ethylene glycol, or the like can be used as the liquid.

The partition member 117 is formed in a flat disk shape and is fitted into the second attachment member 111. Accordingly, the liquid chamber 114 in the second attachment member HI is partitioned into the main liquid chamber 113 which is defined by the elastic body 113 and the partition member 117 and the auxiliary liquid chamber 116 which is defined by the diaphragm 119 and the partition member 117. In addition, the diaphragm main body 119a is deformed to be expanded or contracted according to an inflow of the liquid into the auxiliary liquid chamber 116 and an outflow of the liquid from the auxiliary liquid chamber 116.

A restriction passage 121 which communicates with the main liquid chamber 115 and the auxiliary liquid chamber 116 is formed in the partition member 117. The restriction passage 121 communicates with the main liquid chamber 115 and the auxiliary liquid chamber 116 through a main liquid chamber-side opening (not shown) and an auxiliary liquid chamber-side opening (nut shown) which are formed in the partition member 117.

If axial vibrations are input to the vibration damping device 100, the diaphragm main body 119a is deformed to be expanded or contracted, and the liquid flows between the main liquid chamber 115 and the auxiliary liquid chamber 116 though the restriction passage 121. Accordingly, the vibrations are dampened and absorbed.

For example, aluminum or the like can be used as a material of the metal bracket 120.

The metal bracket 120 includes an accommodation tubular portion 120a which is formed in a tubular shape with a bottom coaxially with the center axis O and a lower-side flange portion 120b which protrudes radially outward from an upper end opening edge of the accommodation tubular portion 120a and is the fixing portion.

The main body tubular portion Ilia, the inclination tubular portion 111b, and the upper tubular portion Hid of the second attachment member 111 are accommodated in the accommodation tubular portion 120a. The lower-side flange portion 120b abuts against or approaches the upper-side flange portion 111c of the second attachment member 111 from below.

Here, a chamfered portion 120d which extends radially outward as going upward is formed on the upper end opening edge of the metal bracket 120 of the third embodiment. An O ring (hereinafter referred to a second seal portion 123) formed of rubber or the like is interposed between the chamfered portion 120d, and the upper-side flange portion 111e and the upper tubular portion 111d of the second attachment member. Accordingly, the second seal portion 123 is elastically deformed in an approximately triangular shape, and an upper-side (one side in the axial direction) end portion of the second attachment member 111 is airtightly fitted into the metal bracket 120 via the second seal portion 123.

In addition, in the third embodiment, the O ring is used as the second seal portion 123. However, lot example, the second seal portion 123 may be formed by vulcanization-bonding to rubber or the like to the metal bracket 120 or the second attachment member 111.

The diaphragm 110 includes a tubular diaphragm ring 118 which is liquid-tightly fitted into a lower end portion (the other end portion in the axial direction) of the second attachment member 111 via a coating rubber, and an elastically deformable disk-shaped diaphragm main body 119a which closes the inside of the diaphragm ring 118.

The diaphragm main body 119a is formed of rubber or the like and is vulcanization-bonded to an inner circumferential surface of the diaphragm ring 118. A lower end portion of the second attachment member 111 is caulked radially inward, and thus, the diaphragm ring 118 is fixed.

The diaphragm ring 118 includes a tubular ring main body portion 118a and an annular pressure receiving portion 118b which extends radially inward from the lower end opening edge of the ring main body portion 118a. In addition, in the diaphragm ring 118, a first seal portion 119b continuously extending over the entire circumference is provided downward.

For example, each of the ring main body portion 118a and the pressure receiving portion 118b is formed of a material having a large hardness such as metal. For example, the first seal portion 119b is formed of a material having large elasticity such as rubber. At least a portion of the first seal portion 119b is axially interposed between the pressure receiving portion 118b and a bottom wall portion of the metal bracket 120. In addition, in the third embodiment, the first seal portion 119b is integrally formed with the diaphragm main body 119a. However, the first seal portion 119b and the diaphragm main body 119a may be separated from each other. In this case, for example, an O ring or the like may be used as the first seal portion 119b.

An air chamber S11 is defined by an upper surface in the bottom wall portion of the accommodation tubular portion 120a, an inner circumferential surface of the first seal portion 119b, and an upper surface of the diaphragm main boy 119a. A lower end portion of the first seal portion 119b airtightly abuts against an inner surface of the bottom wall portion of the metal bracket 120. Accordingly, the air chamber S11 is sealed.

For example, air having an atmospheric pressure or the like is enclosed in the air chamber S11. Therefore, an outer surface of the diaphragm main body 119a is exposed to the atmospheric pressure.

An outer diameter of the main body tubular portion 111a of the second attachment member 111 is smaller than an inner diameter of the accommodation tubular portion 120a of the metal bracket 120, and thus, a gap is formed between the second attachment member 111 and the metal bracket 120. In addition, a lower end portion of the gap is closed by the first seal portion 119b, an upper end portion thereof is closed by the second seal portion 123, and the gap is in a vacuum state. According to this configuration, between an outer circumferential surface of the second attachment member 111 and an inner circumferential surface of the metal bracket 120, a portion positioned between the first seal portion 119b and the second seal portion 123 becomes a vacuum sealed space S21 which continuously extends over the entire circumference.

In addition, the first seal portion 119b of the diaphragm 119 and the bottom wall portion in the accommodation tubular portion 120a of the metal bracket 120 is in air tight-contact with each other, and thus, even when the sealed space S21 is in a vacuum state, air in the air chamber S11 can be prevented from leaking into the gap S21.

In a manufacturing method of the above-described vibration damping device 100, for example, in a state where the liquid is enclosed in the liquid chamber 114, the first attachment member 112, the elastic body 113, the partition member 117, the second attachment member 111, and the diaphragm 119 are assembled, and thus, an intermediate unit is achieved.

In addition, after the intermediate unit is press-fitted into the metal bracket 120 by a press machine or the like in a vacuum chamber, air may be injected into the air chamber S11 from an air hole (not shown) which is formed in a bottom wall portion of the accommodation tubular portion 120a of the metal bracket 120 in advance.

Alternatively, the intermediate unit is press-fitted into the metal bracket 120 at the atmospheric pressure, the air in the sealed space S21 is extracted from an exhaust hole 120c which is formed on a circumferential wall of the accommodation tubular portion 120a in advance, and thus, the inside of the sealed space S21 may be evacuated. In this case, the vibration damping device 100 may be accommodated in a vacuum chamber in a state where the exhaust hole 120c is open and the air in the sealed space S21 may be extracted, or the exhaust hole 120c may be connected to a decompression device or the like such that the air in the sealed space S21 is extracted. After the air in the sealed space S21 is extracted, a shaft portion 122b of a rivet 122 is inserted into the exhaust hole 120c, a head portion 122a of the rivet 122 comes into contact with the outer circumferential surface of the accommodation tubular portion 120a, and thus, the exhaust hole 120c is closed, and the vacuum state in the sealed space S21 can be maintained.

According to the vibration damping device 100 configured us described above, in the portion between the outer circumferential surface of the second attachment member 111 and the inner circumferential surface of the metal bracket 120, the portion positioned between the first seal portion 119b and the second seal portion 123 becomes the vacuum sealed space S21 which continuously extends over the entire circumference, and thus, it is possible to prevent heat from being transmitted from the metal bracket 120 to the second attachment member 111.

In addition, the outer surface of the diaphragm main body portion 119a is exposed to the atmospheric pressure, the diaphragm main body 119a is deformed by the inflow and the outflow of the liquid with respect to the auxiliary liquid chamber 116 generated by vibrations input to the vibration damping device 100, and thus, a function for absorbing and dampening the vibrations can be exerted. In addition, the first seal portion 119b is not provided in the diaphragm main body 119a and is provided to protrude front the diaphragm ring 118 having a large hardness, and thus, the first seal portion 119b can strongly abut against the metal bracket 120. Accordingly, it is possible to prevent the air in the air chamber S11 coming into contact with the diaphragm main body 119a from entering the sealed space S21, the vacuum state of the sealed space S21 can be maintained, and thus, it is possible to reliably realize the above-described insulating effects.

In addition, the air chamber S11 is defined by the inner surface of the bottom wall portion of the metal bracket 120 which is formed in a tubular shape with a bottom, the outer surface of the diaphragm main body 119a, and the first seal portion 119b which extends over the entire circumference of the diaphragm ring 118, and the air in the air chamber S11 is in contact with the outer surface of the diaphragm main body 119a. In this way, the air in the air chamber S11 which is hermetically sealed is in contact with the outer surface of the diaphragm main body 119a, and thus, for example, a pressure in the air chamber S11 is larger than the atmospheric pressure, it is possible to suppress occurrence of cavitation. Moreover, for example, compared to a case where the air chamber S11 is not hermetically sealed, heated air around the vibration damping device 100 is prevented from entering the inside of the vibration damping device 100, and it is possible to increase the insulating effects.

Accordingly compared to a case where the diaphragm main body 119a is exposed to the air outside the vibration damping device 100, it is possible to stabilize components or the like of the air being in contact with the outer surface of the diaphragm main body 119a, and it is possible to prevent deterioration or the like of the diaphragm main body 119a.

Moreover, for example, it is possible to adjust ease of a deformation of the diaphragm main body 119a by adjusting an internal volume of the air chamber S11, and for example, compared to a case where a material of the diaphragm 119 is changed, it is possible to easily tune characteristics of the vibration damping device 100 with respect to the input vibrations.

In addition, at least a portion of the first seal portion 119b is interposed between the pressure receiving portion 118b and the metal bracket 120 in the axial direction, and thus, when the first seal portion 119b is compressed in the axial direction, the pressure receiving, portion 118b can receive the pressure. Accordingly, for example, it is possible to prevent the first seal portion 119b from being deformed or displaced together with the diaphragm main body 119a, and to maintain a vacuum state of the sealed space S21.

Moreover, a technical scope of the present invention is not limited to the above-described embodiments, and various modifications can be made within a range which does not depart from the scope of the present invention.

For example, in the above-described embodiments, the gap S2 is a vacuum sealed space. However, a gas such as air, a liquid or solid heat insulating material, or the like may be enclosed in the gap S2.

In addition, in the example of FIG. 2, the heat insulating member 22 may be provided between the plurality of rigid portions 20c in the circumferential direction.

In addition, shapes of the fixed portion 11g of the second attachment member 11 and the fixing portion 20b of the metal bracket 20 are not limited to the above-described embodiments, and various shapes can be applied.

For example, in the first embodiment, even in a case where the fixed portion 11g and the fixing portion 20b having shapes different from the shapes shown in FIG. 1 are provided, the rigid portions 20c and the heat insulating member 22 are provided between the fixed portion 11g and the fixing portion 20b, and thus, it is possible to exert effects of the present invention.

For example, in the third embodiment, the air chamber S11 is closed by the bottom wall portion of the accommodation tubular portion 120a, the first seal portion 119b, and the diaphragm main body 119a. However, the present invention is not limited to this. For example, a through-hole may be formed on the bottom wall portion of the accommodation tubular portion 120a, the inside of the air chamber S11 and an external space of the vibration damping device 100 may communicate with each other via the through-hole, and the diaphragm main body 119a is exposed to the atmospheric pressure.

Moreover, in the third embodiment, the first seal portion 119a abuts against the bottom wall portion of the metal bracket 120. However, the first seal portion 119b may abut against a circumferential wall of the metal bracket 120.

Moreover, in the third embodiment, the sealed space S21 is in a vacuum state. However, a gas such as air, a liquid or solid heat insulating material, or the like may be enclosed in the sealed space S21.

Moreover, the gas enclosed in the air chamber S11 is not limited to the air having the atmospheric pressure, and may be a gas having a higher pressure than the pressure in the sealed space S21. The outer surface of the diaphragm main body 119a is exposed to the gas having a higher pressure than the pressure in the sealed space S21. Accordingly, for example, it is possible to easily tune the characteristics of the vibration damping device 100 by adjusting the pressure of the gas.

Moreover, shapes of the first seal portion 119b and the bottom portion of the metal bracket 120 are not limited to the example of FIG. 5. For example, a convex portion protruding upward may be formed on the bottom portion of the metal bracket 120, and the convex portion may abut against the first seal portion 119b to improve sealing performance. Alternatively, the metal bracket 120 having a convex portion or a concave portion abutting against the first seal portion 119b from a radially inner side or a radially outer side may be adopted, and seating performance when the first seal portion 119b is deformed at the time of the vibration input may be secured.

In addition, the vibration damping devices 1, 10, and 100 according to the present invention are not limited to being used as the engine mount of the automobile, and can be applied to a portion other than the engine mount. For example, the vibration damping devices can be applied to a mount of a generator mounted on a construction machine, or can be applied to a mount of a machine installed in a factory or the like.

Moreover, within a scope of the present invention, it is possible to appropriately replace constituent elements in the above-described embodiments with well-known constituent elements, and the above-described embodiment and modification examples may be appropriately combined.

INDUSTRIAL APPLICABILITY

According to the vibration damping devices of the present invention, it is possible to prevent heat from being transmitted to the attachment member provided in the bracket.

REFERENCE SIGNS LIST 1, 10, 100: vibration damping device
11, 23, 111: second attachment member
11g, 23c: fixed portion
12, 112: first attachment member
14, 114: liquid chamber
15, 115: main liquid chamber
16, 116: auxiliary liquid chamber
17, 117: partition member
18, 118: diaphragm ring
19, 119: diaphragm
20, 120: metal bracket
20b: fixing portion
20c, 23e: rigid portion
22: heat insulating member (second seal portion)
111c: upper-side flange portion (fixed portion)
119a: diaphragm main body
119b: first seal portion
120b: tower-side flange portion (fixing portion)
123: second seal portion
S1, S11: air chamber
S3: gap
S21: sealed space

What is claimed is:

1. A vibration damping device comprising:
a tubular metal bracket which is connected to any one of a vibration generating portion and a vibration receiving portion;
a first attachment member which is connected to the other of the vibration generating portion and the vibration receiving portion;
a tubular second attachment member which is inserted into the metal bracket;
an elastic body which connects the first attachment member and the second attachment member to each other;
a partition member which partitions a liquid chamber in the second attachment member into a main liquid chamber having the elastic body as a portion of a partition wall and an auxiliary liquid chamber; and
a diaphragm which constitutes a portion of a partition wall of the auxiliary liquid chamber,
wherein one of end opening portions of the second attachment member in an axial direction is closed by the elastic body and the other thereof is closed by the diaphragm,
wherein a fixing portion which fixes the second attachment member is formed on the metal bracket,
wherein a fixed portion which is fixed to the fixing portion of the metal bracket is formed on the second attachment member,
wherein a gap is provided between a portion of an outer circumferential surface of the second attachment member, and a portion of an inner circumferential surface of the metal bracket,
wherein a second seal portion is provided between the fixed portion and the fixing portion, and
wherein the diaphragm includes a lower tubular portion extending from an outer circumferential edge portion of the lower surface of the diaphragm to the inner surface of the metal bracket such that an air chamber is formed by the inner surface of the lower tubular portion of the diaphragm, the lower surface of the diaphragm, and the inner surface of the metal bracket.

2. The vibration damping device according to claim 1, wherein a rigid portion having a higher hardness than that of a heat insulating member which is the second seal portion is further provided between the fixed portion and the fixing portion, and
wherein a plurality of the rigid portions are provided at intervals in a circumferential direction.

3. The vibration damping device according to claim 1, wherein the gap is a vacuum sealed space.

4. The vibration damping device according to claim 1, wherein the diaphragm includes a diaphragm ring which is fitted into the other end portion of the second attachment member in the axial direction and an elastically deformable diaphragm main body which closes an inside of the diaphragm ring,
wherein a first seal portion which continuously extends over the entire circumference of the diaphragm ring and abuts against the metal bracket protrudes from the diaphragm ring,
wherein the one end portion of the second attachment member in the axial direction is fitted into the metal bracket via the second seal portion, and
wherein between the outer circumferential surface of the second attachment member and the inner circumferential surface of the metal bracket, a portion positioned between the first seal portion and the second seal portion is a vacuum sealed space.

5. The vibration damping device according to claim 4, wherein the metal bracket is formed in a tubular shape with a bottom and the first seal portion abuts against an inner surface of the metal bracket.

6. The vibration damping device according to claim 4, wherein an outer surface of the diaphragm main body is exposed to a gas having a higher pressure than a pressure in the sealed space.

7. The vibration damping device according to claim 1, wherein the gap is a vacuum state and the air chamber is filled with an air of atmospheric pressure.

8. The vibration damping device according to claim 7, further including a tubular diaphragm ring fitted into the lower end portion of the second attachment member, wherein the outer circumferential portion of the diaphragm is vulcanization-bonded to an inner circumferential surface of the diaphragm ring, wherein the lower end portion of the second attachment member is caulked radially inward, and thus, the tubular diaphragm ring is fixed, and wherein the lower end opening portion of the second attachment member is hermetically sealed by the diaphragm.

9. The vibration damping device according to claim 2, wherein the second attachment member further includes:

a main body tubular portion which is formed in a tubular shape coaxially with the center axis, an inclination tubular portion which extends upward as going radially outward from an upper end opening edge of the main body tubular portion, an annular upper flange which extends radially outward from an upper end portion of the inclination tubular portion, an upper tubular portion which extends downward from an outer circumferential edge portion of the upper flange, and a lower flange which extends radially inward from a lower end opening edge of the upper tubular portion, wherein the fixed portion includes the upper flange, the upper tubular portion, and the lower flange, and wherein the fixing portion and the rigid portions of the metal bracket are axially interposed between the upper flange and the lower flange so that the fixed portion is fixed to the fixing portion.

* * * * *